（12） United States Patent
Gobeil

(10) Patent No.: US 7,609,630 B2
(45) Date of Patent: Oct. 27, 2009

(54) COMMUNICATION TRAFFIC TYPE DETERMINATION DEVICES AND METHODS

(75) Inventor: Charles Marc Gobeil, Ottawa (CA)

(73) Assignee: Alcatel Lucent, Paris (FR)

( * ) Notice: Subject to any disclaimer, the term of this patent is extended or adjusted under 35 U.S.C. 154(b) by 553 days.

(21) Appl. No.: 11/408,857

(22) Filed: Apr. 21, 2006

(65) Prior Publication Data

US 2007/0248006 A1    Oct. 25, 2007

(51) Int. Cl.
H04L 12/26    (2006.01)
(52) U.S. Cl. .................................. 370/230; 370/389
(58) Field of Classification Search ............... 370/389
See application file for complete search history.

(56) References Cited

U.S. PATENT DOCUMENTS 6,711,165 B1 * 3/2004 Tzeng ........................ 370/392
2003/0231627 A1 * 12/2003 John et al. ................... 370/389
2004/0185621 A1 * 9/2004 Sadd et al. .................. 438/260

* cited by examiner

Primary Examiner—Chirag G Shah
Assistant Examiner—Otis L Thompson, Jr.
(74) Attorney, Agent, or Firm—Smart + Biggar

(57) ABSTRACT

Communication traffic type determination devices and methods are disclosed. A received block of communication traffic is concurrently analyzed relative to multiple traffic type definitions, and indications of whether the received block of communication traffic conforms to the traffic type definitions are provided. Concurrent analysis of the same traffic block relative to different traffic type definitions can reduce the amount of time that might otherwise be involved in determining a type of the traffic block. Evaluation of traffic against multiple definitions may also allow traffic to be classified or verified more specifically than would be possible based solely on explicit type indications provided in traffic overhead.

17 Claims, 3 Drawing Sheets

COMMUNICATION TRAFFIC TYPE DETERMINATION DEVICES AND METHODS

FIELD OF THE INVENTION

This invention relates generally to communications and, in particular, to determining types of communication traffic.

BACKGROUND

In many communication systems, it is necessary to determine a type of received communication traffic, so as to verify packets of data across an interface against an interface specification or to classify traffic, for example.

Traffic type decisions are typically made on the basis of information in network headers or other overhead. Traditionally, data and other actual content of communication traffic is treated as a "black box" for the purposes of type determination. In the event that any information that would normally be included in the data portion of a communication traffic block such as a packet is required for decision making in a communication network, this information is instead tagged to the block as a header.

Although headers and other overhead tend to be foolproof and sufficient for all uses intended when a protocol is first developed, information required for decision making beyond such initial intended uses is not directly available in overhead without changing the protocol or layering on a new protocol. Full analysis of communication traffic content when the traffic overhead does not provide all required information tends to be expensive and difficult, since packets and other traffic blocks might contain only fragments of data, possibly in an unknown format.

This sort of challenge in type determination might arise, for example, where a specification does not define all protocol elements to the same level of detail, or traffic packets do not include complete protocol information in their overhead. A specification for a communication equipment control interface might explicitly define "Type", "Parameter", and "Allowed Values" elements for a hierarchy of Type>>Subtypes>>Parameters>>Allowed Values, but packets might not include standardized "Subtype" identifiers. Subtype determination might be a challenge, for instance, if different equipment vendors are allowed to choose in which parameter their Subtype name is stored or to not explicitly list a Subtype at all. In one currently known protocol, Subtype is conceptually a valid combination of parameters, which was given a name in the protocol specification, but is not explicitly identified in live data streams.

In the above example, without narrowing valid parameters to those that are valid for only a given Subtype instead of the generic Type, validation rules that are used to determine whether a received packet conforms to the specification could be too loose to catch anything but the most obvious errors.

One possible solution to this problem in the above example might be to develop specific software code to identify the Subtype for each special case, such as for each vendor-specific Subtype. However, this approach could be time-consuming and complicated, especially for a large number of special cases, and therefore expensive to implement. Custom software code would also have to be maintained manually as new special cases are identified. In addition, a custom special-case solution would be prone to error when faced with never-before-seen data, which is precisely when it would be used the most.

Thus, there remains a need for improved communication traffic type determination techniques.

SUMMARY OF THE INVENTION

Some embodiments of the invention provide a mechanism for accurately verifying packets against a protocol specification when limited packet classification data makes it difficult to establish tight validation rules. Hints may be inferable from data fragments in a packet payload, for example, to allow new features involving more intensive packet classification to be implemented without layering on a new protocol to include decision information in packet headers or other overhead. Entire packets, including overhead and content, can then be used to determine packet type, or more generally communication traffic type.

A block of communication traffic may be analyzed against multiple type definitions, illustratively every Subtype, in parallel to validate or classify the block. For a validity check, if a type definition is a perfect match, then a packet would considered to be valid. In the absence of a perfect match, then a closest matching definition might be used as a basis against which errors can be reported.

According to an aspect of the invention, a device includes an interface for receiving blocks of communication traffic, and a plurality of analysis modules operatively coupled to the interface and operable to concurrently analyze a received block of communication traffic relative to respective traffic type definitions. Each analysis module of the plurality of analysis modules is further operable to provide an indication of whether the received block of communication traffic conforms to its respective traffic type definition.

The analysis modules may include at least one analysis module implemented in software for execution by a processing element.

In some embodiments, the respective traffic type definitions include definitions associated with a level in a multi-level traffic type definition. The level may be a predetermined level in a hierarchy of the multi-level traffic type definition, in which case the device may also include a definition set selector operatively coupled to the interface and to the plurality of analysis modules. The definition set selector is operable to detect, in overhead of the received block of communication traffic, an indication of a type of the received block of communication traffic at a level of the multi-level traffic type definition that is higher in the hierarchy than the predetermined level.

If the hierarchy comprises groups of types at the predetermined level associated with respective types at the higher level, then the plurality of analysis modules may include respective groups of analysis modules corresponding to the groups of types.

A definition set selector may determine by which analysis modules the received block of communication traffic is to be analyzed.

In some embodiments, the device also includes a plurality of further analysis modules operatively coupled to the interface and operable to concurrently analyze the received block of communication traffic relative to respective further traffic type definitions associated with a different level in the multi-level traffic type definition, and to provide an indication of whether the received block of communication traffic conforms to each of the respective further traffic type definitions, and a definition set selector operatively coupled to the interface, to the plurality of analysis modules, and to the plurality of further analysis modules. The definition set selector is operable to detect, in overhead of the received block of communication traffic, an indication of a type of the received block of communication traffic at a level of the multi-level traffic type definition, and to determine, based on the detected indication and a hierarchy of the multi-level traffic type definition, whether the received block of communication traffic is to be analyzed by the analysis modules or by the further analysis modules.

Each indication of whether the received block of communication traffic conforms to a respective traffic type definition may include a likelihood indication. If the likelihood indication for a traffic type definition is below a threshold, an indication of differences between the received block of communication traffic and the traffic type definition may also be provided.

The device may also include a filter operatively coupled to the plurality of analysis modules and operable to provide as a traffic type decision output a set of one or more highest likelihood indications among the indications.

In some embodiments, the device includes a parameter input interface operatively coupled to the plurality of analysis modules and operable to receive and provide to the plurality of analysis modules a type determination parameter, in which case the plurality of analysis modules include an analysis module that is operable to determine whether the received block of communication traffic conforms to its respective traffic type definition based on the received block of communication traffic and the received type determination parameter.

The type determination parameter may include at least one of: a time of day, an alert associated with a communication system through which the communication traffic is received, a communication traffic history, and, where the respective traffic type definitions comprise definitions associated with a level in a multi-level traffic type definition, an indication of whether the received block of communication traffic conforms to a further traffic type definition associated with a different level in the multi-level traffic type definition.

The blocks of communication traffic are packets in some embodiments.

A method according to another embodiment of the invention involves receiving a block of communication traffic, performing a parallel analysis of the received block of communication traffic relative to a plurality of traffic type definitions, and providing a respective indication of whether the received block of communication traffic conforms to each traffic type definition of the plurality of traffic type definitions.

The plurality of traffic type definitions may include definitions associated with a predetermined level in a hierarchy of a multi-level traffic type definition.

Where the hierarchy includes groups of types at the predetermined level associated with respective types at a higher level in the hierarchy, the method may also involve determining a type of the received block of communication traffic at the higher level. In this case, the operation of performing may involve analyzing the received block of communication traffic relative to each traffic type definition corresponding to a type in the group of types associated with the determined type.

The method may also involve detecting, in overhead of the received block of communication traffic, an indication of a type of the received block of communication traffic at a level in a hierarchy of a multi-level traffic type definition, and selecting the plurality of traffic type definitions, from traffic type definitions associated with a plurality of levels in the hierarchy, based on the detected indication.

In some embodiments, providing involves providing a likelihood indication, and providing an indication of differences between the received block of communication traffic and each traffic type definition for which the likelihood indication is below a threshold.

The method may also involve receiving a type determination parameter, and determining whether the received block of communication traffic conforms to a traffic type definition of the plurality of traffic type definitions based on the received block of communication traffic and the received type determination parameter.

A method may be embodied, for example, in instructions stored on a machine-readable medium.

Another aspect of the invention provides a device that includes an interface for receiving blocks of communication traffic, and a replicator operatively coupled to the interface and operable to replicate a received block of communication traffic, and to provide replicated copies of the received block of communication traffic for output to a plurality of analysis modules that analyze the replicated copies relative to a plurality of traffic type definitions.

In some embodiments, the device also includes the analysis modules. A first analysis module and a second analysis module may be operable to analyze replicated copies of the received communication traffic such that at least a portion of an analysis operation is performed by the first analysis module during a time at which at least a portion of an analysis operation is being performed by the second analysis module.

Other aspects and features of embodiments of the present invention will become apparent to those ordinarily skilled in the art upon review of the following description.

BRIEF DESCRIPTION OF THE DRAWINGS

Examples of embodiments of the invention will now be described in greater detail with reference to the accompanying drawings.

DETAILED DESCRIPTION OF PREFERRED EMBODIMENTS

Figure 1:
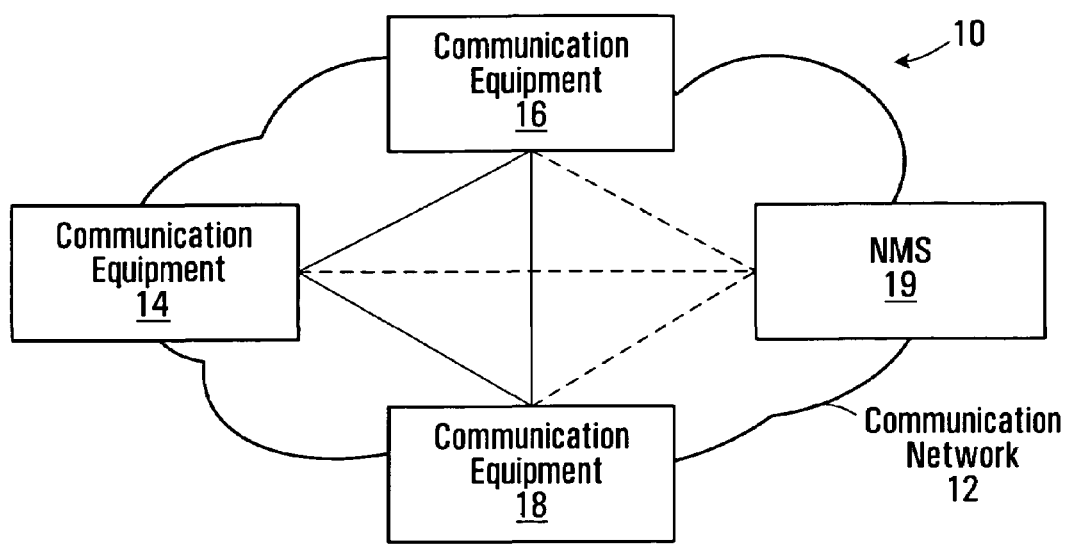
FIG. 1 is a block diagram of a communication system.

FIG. 1 is a block diagram of a communication system 10. The communication system 10 includes a communication network 12, communication equipment 14, 16, 18, and a Network Management System (NMS) 19.

Although a communication system may include multiple communication networks, each having respective communication equipment and possibly an NMS, only one communication network 12 and one NMS 19 have been shown in FIG. 1 to avoid overly complicating the drawing. A communication network may also have more or fewer than three installations of communication equipment 14, 16, 18. In addition, other equipment may be provided within a communication network or operate in conjunction with a communication network, such as end user equipment and other user, management, or control equipment.

It should therefore be appreciated that the communication system 10 of FIG. 1, as well as the contents of the other drawings, are intended solely for illustrative purposes, and that the present invention is in no way limited to the particular example embodiments explicitly shown in the drawings and described herein.

The communication network 12 includes equipment 14, 16, 18 through which communications may be established.

The equipment 14, 16, 18 in the communication network 12 may be operatively coupled together through any of various types of connections over which communication signals can be exchanged. Connections may include wired connections, wireless connections, or some combination thereof. Communications over these connections may be established, for example, for telephone calls and data communication sessions.

The particular types of connections and communication signal exchange available in the communication network 12 are at least to some extent dependent upon the type of the equipment 14, 16, 18 used to implement the network, the protocols used in the network, the services offered by service providers using the network, the type of end user equipment for which the connections are established, for instance, and/or possibly other factors.

The communication equipment 14, 16, 18, may include network elements such as switches or routers, or other types of communication equipment. Those skilled in the art will be familiar with these and many other examples of communication equipment.

Control and management functions, which may include connection setup, management, and release, failure protection, and network monitoring, for example, are provided by the NMS 19. The NMS 19 is operatively coupled to the equipment 14, 16, 18 and exchanges at least control information with these components. Control paths between the NMS 19 and the equipment 14, 16, 18 may share the same network connections as data paths between the equipment 14, 16, 18, although separate, dedicated control connections may also or instead be used.

In one possible implementation of the system 10, communications along any given link in the communication network 12 may be monitored and processed according to the techniques disclosed herein. This may be accomplished, for example, by capturing or generating a trace, or snapshot, of communications along a link of interest. Monitored communications may include, for example, user traffic transferred between communication equipment 14, 16, 18, and/or control traffic transferred between the NMS 19 and delegate network element managers that manage each of the installations of communication equipment.

The operation of many different types of communication system will be apparent to those skilled in the art. As the present invention relates primarily to traffic type determination functions, actual communication functions in a communication system are described in detail herein only to the extent necessary to illustrate features of embodiments of the invention.

According to one particular embodiment of the invention, received communication traffic is analyzed against multiple type definitions. Based on this analysis, which in some embodiments involves concurrently comparing traffic content to the multiple type definitions, a determination as to the type of the received traffic is made. Type determination may enable a received packet to be classified by type or validated against a protocol or specification, for example.

Figure 2:
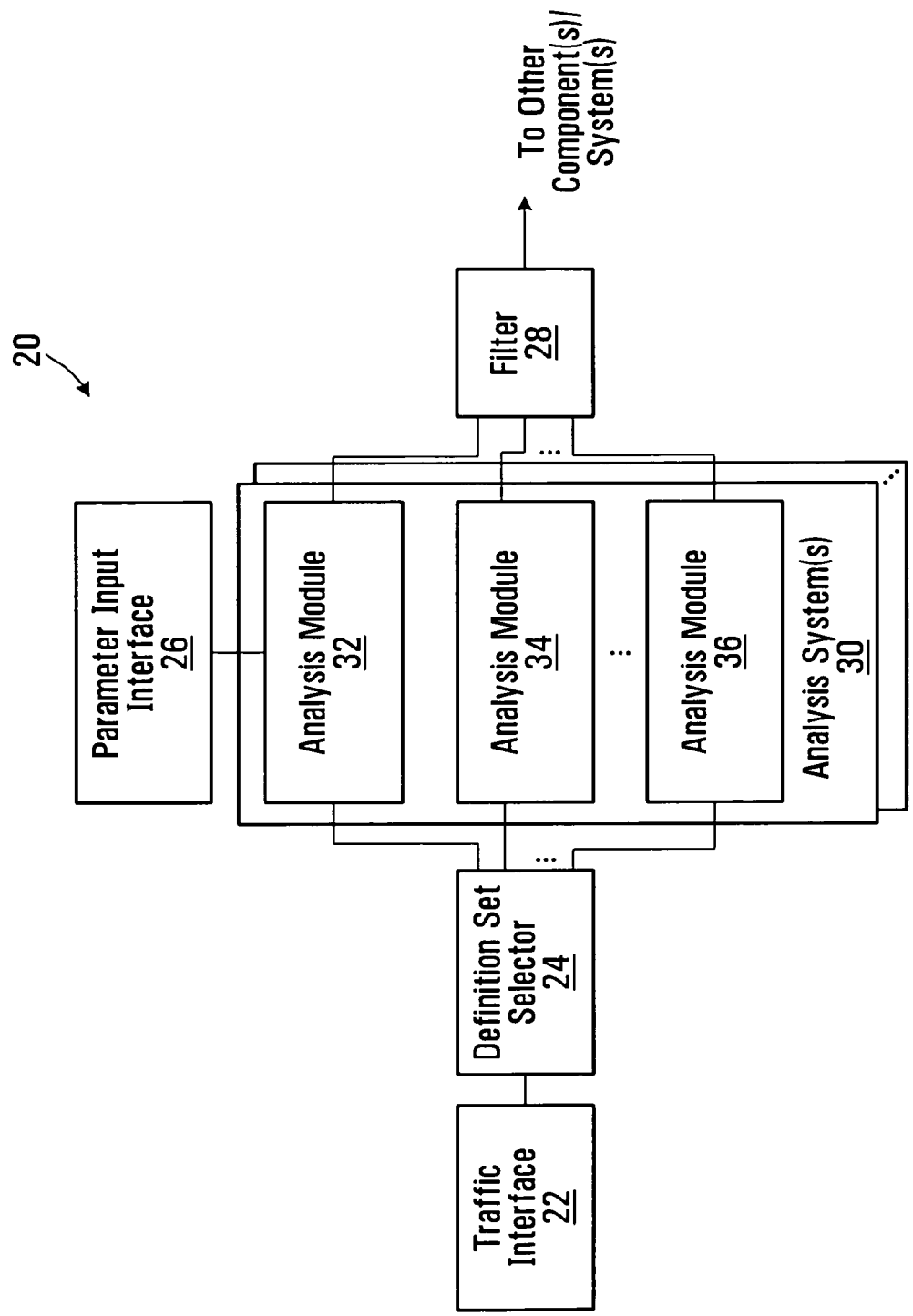
FIG. 2 is a block diagram of a device according to an embodiment of the invention.

FIG. 2 is a block diagram of a device according to an embodiment of the invention. The device 20 includes a traffic interface 22, a definition set selector 24 operatively coupled to the traffic interface, analysis modules 32, 34, 36 of one or more analysis systems 30 operatively coupled to the definition set selector, a parameter input interface 26 operatively coupled to the analysis module 32, and a filter 28 operatively coupled to the analysis modules 32, 34, 36 of the analysis system(s) 30.

The device 20 represents an example of one possible implementation of an embodiment of the invention. The invention is in no way limited to the specific implementation shown in FIG. 2. For example, the functions of the definition set selector 24 and the analysis system(s) 30 could be supported by a single hardware element in some embodiments. Thus, more generally, embodiments of the invention may have fewer, further, or different components with similar or different interconnections than shown in FIG. 2 and the other drawings.

The types of connections through which the components of FIG. 2 are operatively coupled may, to at least some extent, be implementation-dependent. Equipment such as the communication equipment 14, 16, 18 and the NMS 19 (FIG. 1), in which the device 20 could be implemented, often use various types of physical connectors and wired connections for component interconnections. In the case of cooperating software functions, for example, an operative coupling may be through variables or registers, and thus be a form of logical coupling rather than a physical coupling.

Any or all of the other components of the device 20 may be implemented in hardware, software, firmware, or combinations thereof. Electronic components that may be suitable for this purpose include, among others, microprocessors, microcontrollers, Programmable Logic Devices (PLDs), Field Programmable Gate Arrays (FPGAs), Application Specific Integrated Circuits (ASICs), and other types of "intelligent" integrated circuits. The device 20 is therefore described herein primarily in terms of its function. Based on the functional description, a person skilled in the art will be enabled to implement the device 20 in any of various ways.

In operation, the traffic interface 22 receives blocks of communication traffic, such as packets. The traffic interface 22 thus represents one or more physical or logical connections that enable the device 20 to receive communication traffic. A device according to an embodiment of the invention might include one or more than one interface, illustratively different interfaces for receiving communication traffic from different sources. Communication traffic that is analyzed by the device 20 may include, for example, "live" communication traffic that is transferred between users through a communication network or system. The device 20 may also or instead analyze other types of communication traffic, including control traffic that is transferred between an NMS and the equipment that the NMS controls. References herein to communication traffic should thus be interpreted accordingly.

To some extent, the specific structure and function of the traffic interface 22 will be dependent upon the sources from which, and the physical media over which, communication traffic is to be received by the device 20. Those skilled in the art will be familiar with many examples of interfaces for receiving communication traffic.

As noted above, communication traffic typically includes overhead and actual content. Packet and frame headers are examples of overhead. It should be appreciated, however, that overhead need not necessarily be provided in a header, a trailer, or other specific designated portion of a communication traffic block. Overhead information may also or instead be interspersed with content.

As those skilled in the art will appreciate, overhead is information that may be used in processing communication traffic, but might not itself be of value to a recipient of the traffic. A video stream, for example, may be transferred to an end user in a series of packets. In this case, the content of the packets that has value to the end user is the video information in the packets. Each packet would also include overhead in the form of a packet header that might be used for such purposes as routing the packet to the end user, checking the packet for errors, etc., but it is the actual video content that is of value to the end user. For a control packet, content might be control information in the payload of the packet that is used to control configuration settings of a piece of equipment.

The present invention is in no way restricted to these or any other particular forms of overhead or content. Therefore, references to overhead and content should be interpreted to include these and other examples of overhead and content that may be or become apparent to those skilled in the art.

The definition set selector 24 performs an initial type determination function in some embodiments. Overhead in a communication traffic block may include an explicit indication of traffic type, such as a type at one level in a hierarchical traffic type definition. In the above example Type>>Subtypes>>Parameters>>Allowed Values interface specification, which represents an example of a traffic type definition, a packet header might include an explicit indication of Type, at the top level of the definition hierarchy. The definition set selector 24 detects this explicit indication, and can thereby reduce the amount of analysis that is necessary to determine whether the received packet fully conforms to the type definition and also reduce the likelihood of an incorrect type identification. This is described in further detail below.

Each of the analysis modules 32, 34, 36 concurrently analyzes the content of a received block of communication traffic relative to respective traffic type definitions, and provides an indication of whether the received block of communication traffic conforms to its respective traffic type definition. In one illustrative embodiment, these parallel units compare content within a block of communication traffic against a set of patterns, specified in the definitions, for known traffic types. If the same block is analyzed in parallel against multiple definitions, then it can be classified beyond the level specified by explicit identifiers in headers or other overhead, in terms of its probability of membership in a given type, for instance.

The comparisons or other analysis functions performed by the analysis modules 32, 34, 36 are concurrent in the sense that multiple analysis modules analyze a traffic block at the same time. It should be appreciated that not all analysis operations need necessarily begin and/or end at exactly the same time. For example, the analyses associated with different type definitions may involve different operations and thus take different amounts of time to complete. The mechanism through which the analysis modules 32, 34, 36 access a received traffic block might also result in the analysis modules starting their analyses at different times. The received traffic block could be stored at a memory location that is accessible by only one analysis module at a time, for instance. Therefore, the analyses performed by the analysis modules 32, 34, 36 may only partially overlap, but are still considered to be concurrent. At least one analysis module may begin its analysis of a received traffic block before at least one other analysis module completes its analysis, to thereby provide concurrent traffic block analysis.

The analysis modules 32, 34, 36 could be virtually any type of pattern recognition block, including but not limited to checksum units, a neural network, state machines, etc. A neural network trained on sample data might be particularly effective for some implementations.

Simpler recognition units could exploit known traffic type features. In a certain protocol, for example, a particular byte in a packet might represent the size of a content portion or payload of the packet. If the value for that byte in a received packet matches the calculated size of the packet payload, then the received packet has a high probability of being a packet of that type.

Another form of a analysis module could attempt to identify eXtensible Markup Language (XML) packets by measuring the rate of occurrence of the bit patterns for "<" and ">" characters.

Other analysis modules may be or become apparent to those skilled in the art.

Separate parallel analysis modules 32, 34, 36 could be provided for analyzing a received communication traffic block with different type definitions that are associated with a level in a multi-level traffic type definition. The analysis modules 32, 34, 36 might compare a received communication traffic block to different Subtype definitions, for example.

In some embodiments, a hierarchy of a multi-level type definition includes groups of types at one level that are associated with respective types at a next higher level. A Type in the above example may have a number of Subtypes, for instance. In this case, the analysis modules 32, 34, 36 may include respective groups of analysis modules corresponding to the groups of types. The analysis modules 32, 34, 36 may analyze a received communication traffic block relative to respective definitions of Subtypes associated with a Type "A", whereas other analysis modules (not shown) in the same analysis system 30 may analyze a received communication traffic block relative to respective definitions of Subtypes associated with a different Type "B".

The groups of types and analysis modules need not necessarily be mutually exclusive. A single analysis module might be a member of multiple groups.

Where the definition set selector 24 detects an explicit type indication in the overhead of a received communication traffic block, the number of type definitions relative to which the received block is analyzed may be reduced. Continuing with the above example in which the analysis modules 32, 34, 36 correspond to Subtypes associated with a Type "A", and other analysis modules correspond to Subtypes associated with a different Type "B", suppose that the definition set selector 24 detects an explicit Type indication in the overhead of a received packet. The definition set selector 24 can then determine by which group of analysis modules the content of the received packet is to be analyzed based on the detected Type indication. If the explicit indication specifies that the packet is of Type "A", then the packet is passed to the analysis modules 32, 34, 36, whereas detection of a Type "B" indication would result in the received packet being analyzed relative to respective type definitions at the Subtype level by the other group of analysis modules.

Any of various mechanisms may be provided for passing received communication traffic blocks to all analysis modules or only specific analysis modules of an analysis system 30. A received traffic block might be selectively routed to the analysis modules, for example. Another control scheme might involve invoking or otherwise enabling the analysis modules that are to analyze the received traffic block. The definition set selector 24 or another component may include a traffic block replicator to replicate a received traffic block for output to multiple analysis modules 32, 34, 36, so that those analysis modules may concurrently analyze the same traffic block. Further mechanisms may be or become apparent to those skilled in the art.

As shown in FIG. 2, the device 20 may include multiple analysis systems 30, each including multiple analysis modules. One analysis system might include analysis modules corresponding to respective Subtype definitions, whereas another might include analysis modules corresponding to respective Parameter definitions in the above example. In this case, the analysis system that becomes active at any time might be dependent on the lowest level in a type definition hierarchy at which the definition set selector 24 detects a type indication in the overhead of a received traffic block.

If an explicit Type identifier is detected in the header of a received packet, for example, then the Subtype analysis system would analyze the content of the received packet to multiple Subtype definitions associated with the detected Type.

Indications of whether a received block of communication traffic conforms to the traffic type definitions to which it is compared may be provided in any of various forms. In one embodiment, the conformance indication includes a likelihood indication, illustratively a probability. A likelihood indication might be generated, for example, based on a number of differences between a received traffic block and a type definition, the particular fields or entries by which a received traffic block and the type definition differ, etc. If a received communication block does not exactly match a type definition, then the indication might also include an indication of differences between the content of the received traffic block and the traffic type definition.

Some analysis modules may use additional inputs in determining whether a received communication traffic block conforms to its type definition. As shown in FIG. 2, the analysis module 32 is operatively coupled to the parameter input interface 26. Type determination parameters such as time of day are received by the parameter input interface 26 and provided to the analysis module 32. The parameter input interface 26 may also be operatively coupled to the other analysis modules 34, 36 in some embodiments. Thus, any or all of the analysis modules 32, 34, 36 may use additional parameters to determine whether a received communication traffic block conforms to their respective type definitions.

Time of day represents one example of a traffic type determination parameter. Certain types of communication traffic may be transferred more often in a communication network at certain times of day, and accordingly an analysis module may take the time of day into account when determining whether a received communication traffic block conforms to its type definition. The time of day might be assigned a certain weight for use in calculating a value to be output as the conformance indication.

An alert associated with a communication system through which the traffic interface 22 receives communication traffic is another example of a parameter that could be provided to an analysis module through the parameter input interface 26 and used in determining traffic type.

Some types of communication traffic might be inferable from a communication traffic history. A large number of packets in the same stream could be indicative of a video transfer, for instance. History parameters such as packet numbers and timing could be provided to the analysis module 32 and/or to other analysis modules in the device 20.

If the traffic type definitions used by the analysis modules 32, 34, 36 are definitions associated with a level in a multi-level traffic type definition, then an indication of whether the received block of communication traffic conforms to another definition associated with a different level in the multi-level traffic type definition could be provided to any or all of the analysis modules as a type determination parameter. A determination that the received communication traffic block is likely of a certain "Subtype" in the above example definition might be useful in determining whether the received block also conforms to the definition at a "Parameter" level. One analysis system 30 might thereby receive as inputs the outputs of another analysis system.

Type determination parameters might not themselves be compared to received blocks of communication traffic or otherwise analyzed, but rather weighted or otherwise processed for use in calculating conformance indications such as probabilities.

The above examples are illustrative of possible type determination parameters, although other parameters may also or instead be provided to and used by analysis modules. As will be apparent, the parameter input interface 26 may take any of various forms, depending on the parameters to be input to the analysis system(s) 30 and the sources of those parameters.

The filter 28 receives the indications from the analysis modules 32, 34, 36 and provides as a final traffic type decision output a set of one or more of those indications, illustratively the highest likelihood indications. Where a perfect match has been determined by an analysis module 32, 34, 36, only a single indication might be provided. In other embodiments, a certain number of indications, or all indications that have a value above a certain threshold, for example, are provided. This number and/or threshold are user-configurable in some embodiments.

As noted above, additional information may be provided for any type definitions that are not perfectly matched by a traffic block. In one embodiment, this additional information is provided in the form of an error report against the type definition. More generally, the additional information provides details as to why the received communication traffic block did not match a type definition.

In embodiments where multiple analysis systems 30 are provided, the filter 28 may be connected to any or all of the analysis systems. If multiple analysis systems 30 are used to make a type determination for a received traffic block, then the filter 28 might receive conformance indications from one of those systems, such as the analysis system associated with a lowest level of a multi-level type definition. This approach might be applicable where one analysis system provides its conformance indications to a next lower level comparison system as parameter inputs, for instance. In another embodiment, indications for multiple levels could be aggregated into a set of one or more overall type definition conformance indications by the filter 28.

Conformance indication outputs from the device 20 may be provided to any of various other components or systems. Traffic type statistics and/or error reports could be stored in a memory and accessed through an NMS, for example. Another system or component could analyze conformance indications and raise alerts or alarms. Type determination results can make more information available for intelligent applications such as Quality of Service (QoS) or building worm or Denial of Service (DoS) protection into network fabric. Other output mechanisms or arrangements are also possible, and can be customized to different implementations and requirements.

Figure 3:
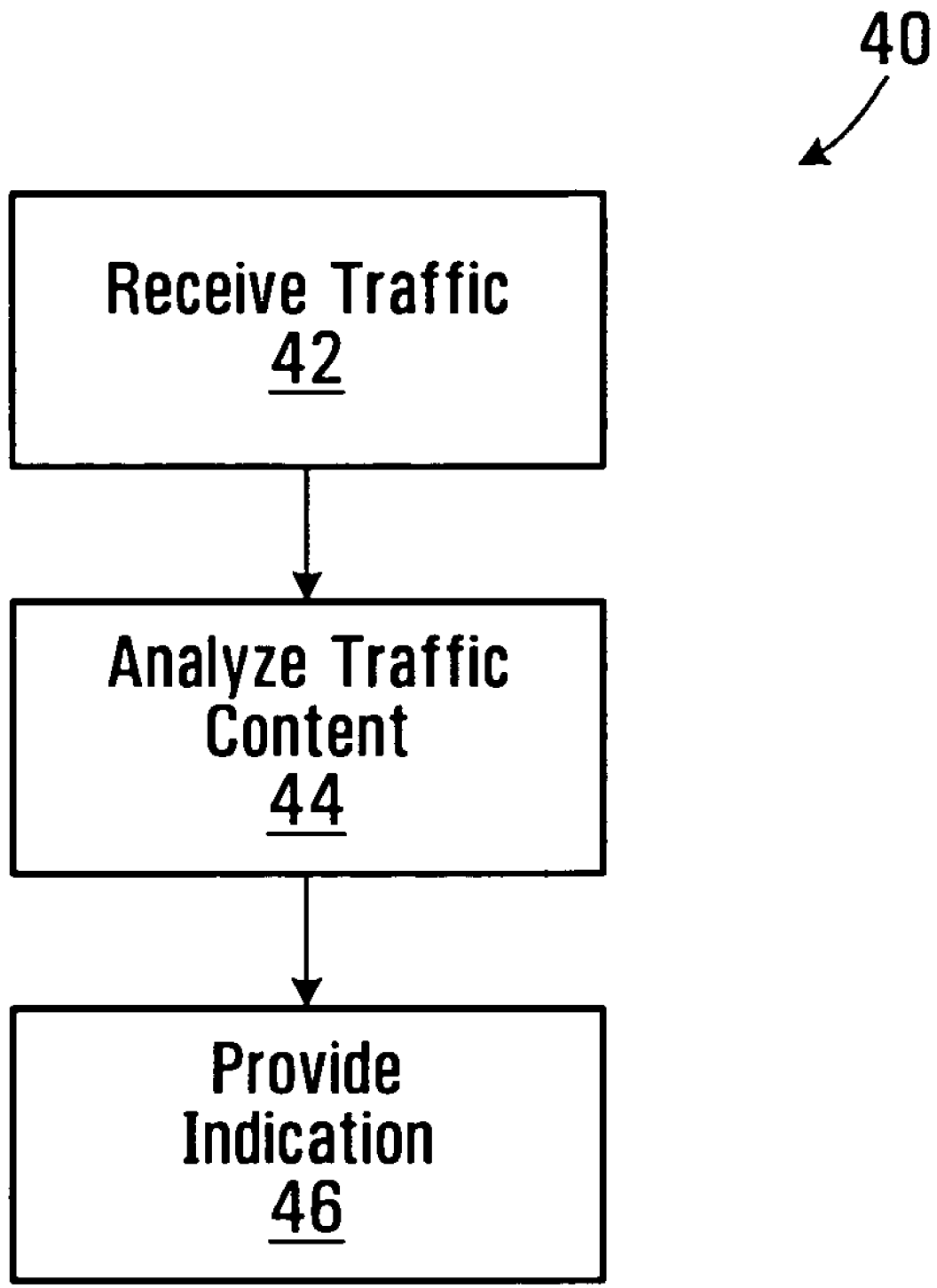
FIG. 3 is a flow diagram of a method according to another embodiment of the invention.

FIG. 3 is a flow diagram of a method according to another embodiment of the invention. The method 40 begins at 42 with an operation of receiving a block of communication traffic. At 44, a parallel analysis of the received block of communication traffic relative to multiple traffic type definitions is performed. A respective indication of whether the received block of communication traffic conforms to each traffic type definition is provided at 46.

The method 40 is illustrative of one embodiment of the invention. Other embodiments may include further, fewer, or different operations, performed in a similar or different order than shown. There may also be various ways of performing operations involved in determining the type of a communication traffic block in accordance with the techniques described herein.

For example, if the traffic type definitions include definitions that are associated with a predetermined level in a hierarchy of a multi-level traffic type definition and the hierarchy includes groups of types at the predetermined level associated with respective types at a higher level in the hierarchy, the method may also include an operation of determining a type of the received block of communication traffic at the higher level. In this case, the content of the received traffic block may be analyzed at 44 relative to each traffic type definition corresponding to a type in the group of types that is associated with the determined higher level type, thereby reducing the amount of analysis that might otherwise be performed.

In another variation of the method 40 that involves detection of a type indication in the overhead of a received traffic block, type definitions associated with different levels of the hierarchy are available. The specific definitions relative to which the received traffic block is analyzed are selected based on the detected level. In general, type definitions for a next lower level in the hierarchy than the detected indication are selected.

As discussed in detail above with reference to FIG. 2, the indication provided at 46 may include a likelihood indication, and an indication of differences between the content of the received traffic block and each traffic type definition for which the likelihood indication is below a threshold.

Type determination parameter processing has also been described above, and represents another example of an operation that may be performed in some embodiments of the invention.

Further variations of the method 40 may be or become apparent to those skilled in the art.

Embodiments of the invention provide a pipelined architecture using parallel pattern recognition elements to determine types of received communication traffic, illustratively through parallel deep packet analysis. A pipelined architecture can provide high performance since pipelining allows multiple blocks to be evaluated simultaneously. With reference to FIG. 2, for example, one packet could be in the definition set selector 24 while another passes through the analysis modules 32, 34, 36, while yet another is being processed by the filter 28, reducing overall throughput delay to the longest single-stage processing time instead of the full path processing time. The analysis stage would likely have the longest single-stage processing time in the pipeline, and become a bottleneck, but its parallelism helps reduce delays.

Relative to at least some other possible approaches for content-based traffic type determination, embodiments of the invention involve significantly less maintenance. For instance, Subtypes might be separated out based on what they are, as opposed to what they might be called, so no specialized code has to be maintained to identify them. The techniques disclosed herein may also be simpler and cheaper to implement than other approaches.

For validation of traffic blocks such as messages across an interface for instance, pass/fail is certain in some embodiments. Although a percentage match or other likelihood indication may be provided, a 100% match indicates that a message is definitely valid, and anything less is definitely not. As noted above, additional information may be provided for indications, percentages in this example, that are below a threshold. From this additional information, an operator or developer may be able to determine where to look for a problem.

Even if an error is made in an estimated traffic type, since a traffic block is evaluated against multiple type definitions during normal operation, a dump of the additional data can be used for manual data validations or confirmations of type determination results.

By checking traffic block content against lower levels in a type definition hierarchy, such as checking Subtype instead of the more generic Type, much tighter bounds on allowed values can be established. Such tighter bounds enable more errors to be detected, and generation of more detailed reports on each error found.

In some protocols, fragments of full information packets are used to perform updates. A pattern matching approach to type determination can be used to identify and validate those packet fragments, where explicit type indication information is excluded completely.

Where a data packet is too small to confidently identify its type, there may still be value in estimating the type directly from the data, even if not with perfect confidence. Over time, type determinations may become more feasible as packet lengths get larger, a trend already emerging with Gigabit Ethernet Jumbo Frames, for example.

What has been described is merely illustrative of the application of principles of embodiments of the invention. Other arrangements and methods can be implemented by those skilled in the art without departing from the scope of the present invention.

For example, although described primarily in the context of methods and systems, other implementations of the invention are also contemplated, such as in instructions stored on a machine-readable medium.

We claim:

1. A device comprising:
    an interface for receiving blocks of communication traffic;
    a plurality of analysis modules operatively coupled to the interface and operable to concurrently analyze a received block of communication traffic relative to respective traffic type definitions, each analysis module of the plurality of analysis modules being further operable to provide an indication of whether the received block of communication traffic conforms to its respective traffic type definition; and
    a definition set selector operatively coupled to the interface and to the plurality of analysis modules,
    wherein the respective traffic type definitions comprise definitions associated with a level in a multi-level traffic type definition,
    wherein the level comprises a predetermined level in a hierarchy of the multi-level traffic type definition,
    wherein the definition set selector is operable to detect, in overhead of the received block of communication traffic, an indication of a type of the received block of communication traffic at a level of the multi-level traffic type definition that is higher in the hierarchy than the predetermined level,
    wherein the hierarchy comprises groups of types at the predetermined level associated with respective types at the higher level, and wherein the plurality of analysis modules comprises respective groups of analysis modules corresponding to the groups of types.

2. The device of claim 1, wherein the plurality of analysis modules comprises at least one analysis module implemented in software for execution by a processing element.

3. The device of claim 1, wherein the definition set selector is further operable to determine by which analysis modules the received block of communication traffic is to be analyzed.

4. The device of claim 1, wherein each indication of whether the received block of communication traffic conforms to a respective traffic type definition comprises a likelihood indication.

5. The device of claim 4, wherein the indication further comprises, where the likelihood indication for a traffic type definition is below a threshold, an indication of differences between the received block of communication traffic and the traffic type definition.

6. The device of claim 4, further comprising a filter operatively coupled to the plurality of analysis modules and operable to provide as a traffic type decision output a set of one or more highest likelihood indications among the indications.

7. The device of claim 1, wherein each of the blocks of communication traffic comprises a packet.

8. The device of claim 1, further comprising:
a replicator operatively coupled to the interface and operable to replicate the received block of communication traffic, and to provide replicated copies of the received block of communication traffic to the plurality of analysis modules.

9. A device comprising:
an interface for receiving blocks of communication traffic;
a plurality of analysis modules operatively coupled to the interface and operable to concurrently analyze a received block of communication traffic relative to respective traffic type definitions, each analysis module of the plurality of analysis modules being further operable to provide an indication of whether the received block of communication traffic conforms to its respective traffic type definition, wherein the respective traffic type definitions comprise definitions associated with a level in a multi-level traffic type definition;
a plurality of further analysis modules operatively coupled to the interface and operable to concurrently analyze the received block of communication traffic relative to respective further traffic type definitions associated with a different level in the multi-level traffic type definition, and to provide an indication of whether the received block of communication traffic conforms to each of the respective further traffic type definitions; and
a definition set selector operatively coupled to the interface, to the plurality of analysis modules, and to the plurality of further analysis modules, the definition set selector being operable to detect, in overhead of the received block of communication traffic, an indication of a type of the received block of communication traffic at a level of the multi-level traffic type definition, and to determine, based on the detected indication and a hierarchy of the multi-level traffic type definition, whether the received block of communication traffic is to be analyzed by the analysis modules or by the further analysis modules.

10. The device of claim 9, further comprising:
a replicator operatively coupled to the interface and operable to replicate the received block of communication traffic, and to provide replicated copies of the received block of communication traffic to the plurality of analysis modules.

11. A device comprising:
an interface for receiving blocks of communication traffic;
a plurality of analysis modules operatively coupled to the interface and operable to concurrently analyze a received block of communication traffic relative to respective traffic type definitions, each analysis module of the plurality of analysis modules being further operable to provide an indication of whether the received block of communication traffic conforms to its respective traffic type definition; and
a parameter input interface operatively coupled to the plurality of analysis modules and operable to receive and provide to the plurality of analysis modules a type determination parameter, the plurality of analysis modules comprising an analysis module that is operable to determine whether the received block of communication traffic conforms to its respective traffic type definition based on the received block of communication traffic and the received type determination parameter,
wherein the type determination parameter comprises at least one of: a time of day, an alert associated with a communication system through which the communication traffic is received, a communication traffic history, and, where the respective traffic type definitions comprise definitions associated with a level in a multi-level traffic type definition, an indication of whether the received block of communication traffic conforms to a further traffic type definition associated with a different level in the multi-level traffic type definition.

12. The device of claim 11, further comprising:
a replicator operatively coupled to the interface and operable to replicate the received block of communication traffic, and to provide replicated copies of the received block of communication traffic to the plurality of analysis modules.

13. A method comprising:
receiving a block of communication traffic;
a plurality of analysis modules, comprising at least one analysis module implemented using a processing element, performing a parallel analysis of the received block of communication traffic relative to a plurality of traffic type definitions, the plurality of analysis modules being operable to concurrently analyze the received block of communication traffic relative to respective traffic type definitions of the plurality of traffic type definitions; and
each analysis module of the plurality of analysis modules providing a respective indication of whether the received block of communication traffic conforms to its respective traffic type definition of the plurality of traffic type definitions,
wherein the plurality of traffic type definitions comprises definitions associated with a predetermined level in a hierarchy of a multilevel traffic type definition,
the method further comprising, where the hierarchy comprises groups of types at the predetermined level associated with respective types at a higher level in the hierarchy, determining a type of the received block of communication traffic at the higher level,
wherein performing comprises the plurality of analysis modules analyzing the received block of communication traffic relative to each traffic type definition corresponding to a type in the group of types associated with the determined type.

14. The method of claim 13, further comprising:
detecting, in overhead of the received block of communication traffic, an indication of a type of the received block of communication traffic at a level in a hierarchy of a multi-level traffic type definition; and
selecting the plurality of traffic type definitions, from traffic type definitions associated with a plurality of levels in the hierarchy, based on the detected indication.

15. The method of claim 13, wherein providing comprises:
each analysis module of the plurality of analysis modules providing a likelihood indication; and
each analysis module of the plurality of analysis modules providing an indication of differences between the received block of communication traffic and its respective traffic type definition where the likelihood indication provided by the analysis module is below a threshold.

16. The method of claim 13, further comprising:
receiving a type determination parameter; and
determining whether the received block of communication traffic conforms to a traffic type definition of the plurality of traffic type definitions based on the received block of communication traffic and the received type determination parameter.

17. The method of claim 13, further comprising:
replicating the received block of communication traffic; and
providing replicated copies of the received block of communication traffic to the plurality of analysis modules.

* * * * *

UNITED STATES PATENT AND TRADEMARK OFFICE
CERTIFICATE OF CORRECTION

PATENT NO. : 7,609,630 B2  Page 1 of 1
APPLICATION NO. : 11/408857
DATED : October 27, 2009
INVENTOR(S) : Charles Marc Gobeil It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 742 days.

Signed and Sealed this

Twelfth Day of October, 2010

David J. Kappos
*Director of the United States Patent and Trademark Office*